I. F. WEBB.
BELT PULLEY.
APPLICATION FILED APR. 9, 1918.

1,331,173.

Patented Feb. 17, 1920.

WITNESSES

INVENTOR
Irving F. Webb
BY Henry Miller
ATTORNEY

UNITED STATES PATENT OFFICE.

IRVING F. WEBB, OF ELIZABETH, NEW JERSEY, ASSIGNOR TO THE SINGER MANUFACTURING COMPANY, A CORPORATION OF NEW JERSEY.

BELT-PULLEY.

1,331,173. Specification of Letters Patent. Patented Feb. 17, 1920.

Application filed April 9, 1918. Serial No. 227,434.

*To all whom it may concern:*

Be it known that I, IRVING F. WEBB, a citizen of the United States, residing at Elizabeth, in the county of Union and State of New Jersey, have invented certain new and useful Improvements in Belt-Pulleys, of which the following is a specification, reference being had therein to the accompanying drawings.

This invention relates to a belt-pulley and especially to a safety device for preventing a belt from being wound about the hub of the pulley when it becomes unshipped.

In mills for manufacturing wearing apparel it is customary to operate a number of sewing machines from a corresponding number of belt-pulleys on a single line shaft located below the row of benches by round belts which run in more or less horizontal directions beneath the benches. Frequently the belts are brushed or otherwise accidentally unshipped, when they are liable to catch upon a projecting bolt or to frictionally grip the hub of the pulley and in either case to be wrapped about the hub and broken. Loss of operators' time and expense of repairs are consequently suffered by the mill owner.

It is an object of this invention to provide simple and inexpensive means for preventing an unshipped belt from breaking. The invention consists essentially of wings or outstanding ribs fast to a pulley and arranged to prevent a belt from catching or wrapping about the hub of the pulley by deflecting it to the smooth round surface of a rotating line shaft on which the belt may hang suspended with little or no danger of winding thereon or breaking. The hub of the pulley is offset to one side of the plane of the rim not extending, as usual, an equal distance on either side thereof. The wings or ribs, which are designed to prevent the belt from catching, extend from the remote end of the hub to the rim with their edges in radial directions sloping down to the plane of the rim. The pulley may be split through diametrically opposite spokes into two sections which are adapted to be bolted together about a line shaft.

Figure 1:
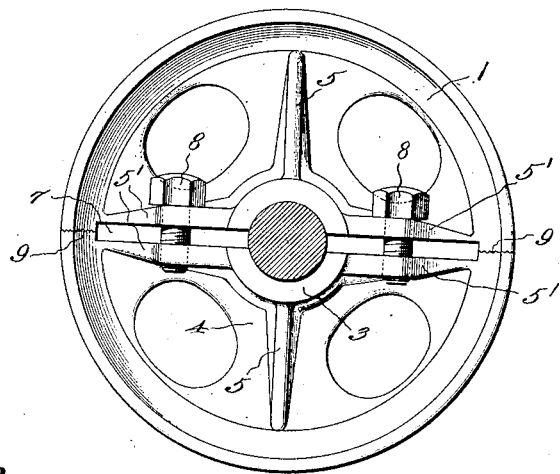
Figure 2:
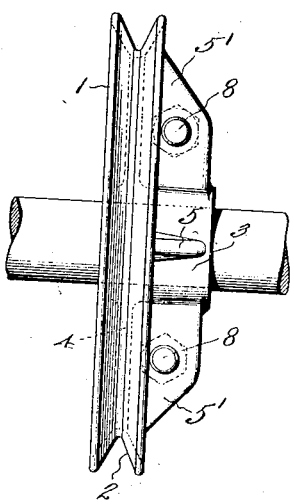
Figure 3:
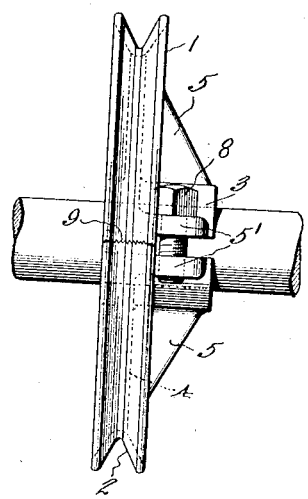

In the accompanying drawings Figure 1 is a plan view of an embodiment of the invention and Figs. 2 and 3 are side elevations thereof.

The invention is illustrated applied to a pulley of the split type. It consists of a rim 1, grooved peripherally as indicated at 2, of a hub 3 offset laterally to one side of the plane of the rim, and of a web or spider 4 connecting the hub and rim in one piece with the spoke-like portions of which web or spider are ribs or wings 5 whose outer edges from the rim to the hub are inclined to the plane of the rim or body of the pulley. Any suitable number of ribs or wings 5 may be provided but the illustrated number has been found to be satisfactory.

The pulleys are preferably cast in one piece with a division or slot 7 extending through diametrically opposite spokes, but not through the rim. Ribs or wings 5' are located on opposite sides of the division or slot 7 and their outer edges are inclined to the plane of the rim more steeply than are the outer edges of the ribs or wings 5 in order to provide sufficient metal for the fastening bolts 8 which are threaded into one and pass loosely through the other of the ribs or wings 5'. The fastening bolts 8 are located to one side of the body of the pulley and may be turned with an ordinary wrench, thus dispensing with the need of a special wrench to turn the bolts and thus avoiding the inconvenience attending the misplacement of a special wrench.

After casting the pulley in one piece, turning the groove 2, drilling the hub to size, and drilling and tapping the wings or ribs 5' to receive the bolts 8, the pulley is fractured as indicated at 9 in line with the slot or division 7 and in any suitable manner. Thus the complete split pulley is prepared ready for mounting on a line shaft, the fractured portions insuring assemblage of the two sections of the pulley upon the line shaft in accurate mating relationship.

From the foregoing description it will be clear that belt shedding or deflecting means are provided on a pulley, which is preferably but not necessarily split, with very little more metal and without any more shop work than is required in the old type of pulley. The pulley of the present invention couples with simplicity and cheapness of construction a desirable certainty of effecting its function of preventing an unshipped belt from wrapping about the hub of a pulley.

Having thus set forth the nature of the invention, what I claim herein is:—

1. A belt-pulley having a rim, web and hub of cast-metal, and a plurality of independent shedding wings in one piece with the web for preventing an unshipped belt from winding about the hub, each of said wings extending laterally from the web and merging into the hub at one side of said web.

2. A belt-pulley having a rim, spokes and hub of cast-metal, and shedding ribs in one piece with the spokes and extending partly at least to one side of the plane of the rim for preventing an unshipped belt from winding about the hub.

3. A belt-pulley whose body comprises a rim, spokes and hub of cast-metal, said hub projecting to one side of the body of the pulley, substantially radial belt deflecting ribs of cast-metal in one piece with said spokes, said ribs being of greater width adjacent the hub than adjacent the rim and having an outer free edge which slopes from the plane of the rim toward the hub.

4. A split belt-pulley having a rim, web and hub formed in halves, a plurality of shedding wings each in one piece with the web and overhanging the hub for preventing an unshipped belt from winding about the hub, and means for securing the halves of the pulley together whereby the pulley may be secured to a shaft.

5. A split belt-pulley having a rim, spokes and hub formed in halves with a line of division through diametrically opposite spokes, means for securing the halves together and adapted to grip the pulley to a shaft, and shedding ribs in one piece with the spokes extending and increasing in width from the rim to the hub.

6. A split belt-pulley having a rim, spokes and hub formed in halves with a line of division through diametrically opposite spokes, means for securing the halves together and adapted to grip the pulley to a shaft, and shedding ribs in one piece with the spokes extending and increasing in width from the rim to the hub, said hub being offset laterally of the plane of the rim to facilitate manipulation of said means for securing the pulley to the shaft.

7. A belt-pulley having a rim, web and hub of cast-metal and means integral with the web and hub for preventing an unshipped belt from winding about the hub, said means merging into said hub adjacent its face and extending beyond the plane of the rim.

In testimony whereof I have signed my name to this specification.

IRVING F. WEBB.